350-420
SR
XR  3,760,704

United States
Baker

[11] 3,760,704
[45] Sept. 25, 1973

[54] REFLEX CAMERA AND VIEWER WITH A FOLDED OPTICAL PATH

[75] Inventor: James G. Baker, Winchester, Mass.

[73] Assignee: Polaroid Corporation, Cambridge, Mass.

[22] Filed: Dec. 30, 1971

[21] Appl. No.: 214,253

[52] U.S. Cl............................ 95/42, 95/50, 350/181
[51] Int. Cl. ........................................... G03b 19/12
[58] Field of Search ..................... 95/42, 50; 353/69, 353/70; 350/181

[56] References Cited
UNITED STATES PATENTS
3,656,411   4/1972   Ataka ...................................... 95/42
3,641,889   2/1972   Eloranta ................................. 95/42
1,283,676  11/1918   Comstock........................ 350/181 X
  751,347   2/1904   Scheimpflug ........................ 350/181
2,177,737  10/1939   Mohr ...................................... 95/50

*Primary Examiner*—Samuel S. Matthews
*Assistant Examiner*—Michael Harris
*Attorney*—Michael Bard et al.

[57] ABSTRACT

A reflex camera and viewer with a folded optical path are described. The optical arrangement of the viewer permits an observer to see and thereby focus an image formed by the objective lens on a focusing screen within the camera. Folding the optical path of the viewer with a mirror near the objective lens permits locating the optic axis of the viewer almost normal to the focusing screen. Other optical elements situate in the optical path of the viewer include a lens forming a real image of the scene focused on the screen by the objective lens and an eye lens magnifying that real image to a convenient size for the observer. Orienting the axes of the two lenses in the viewer at a slight angle to the optic axis of the viewer reduces any field tilt and distortion in the image as seen through the viewer.

21 Claims, 4 Drawing Figures

PATENTED SEP 25 1973 3,760,704
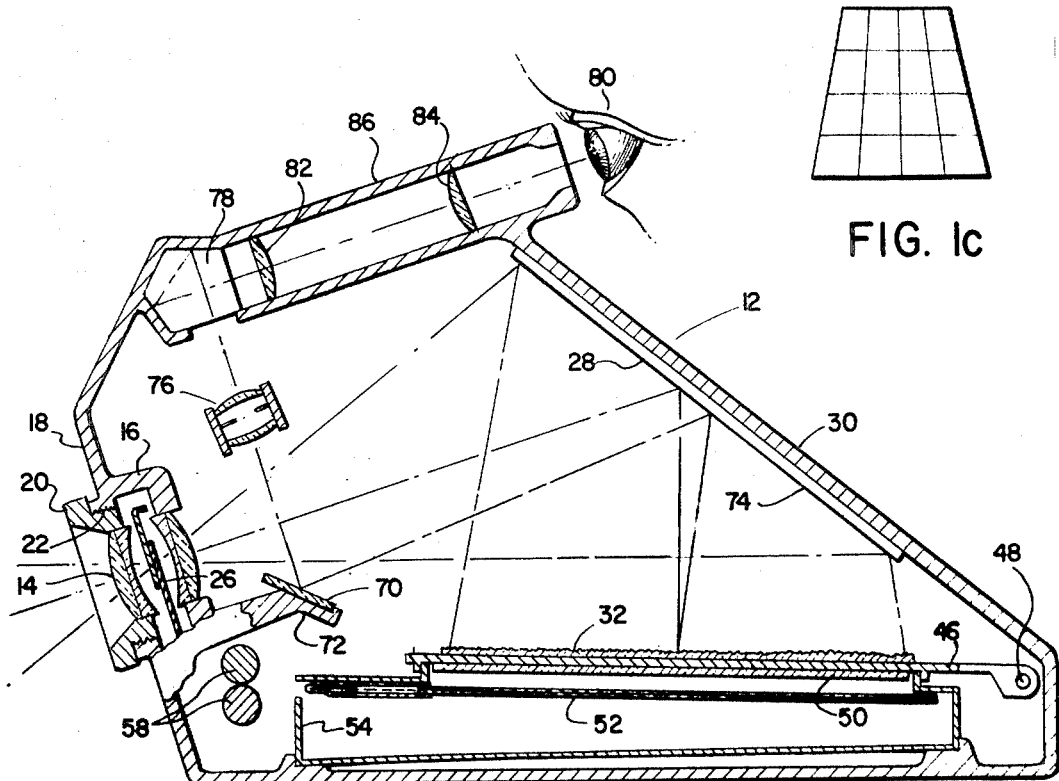
FIG. 1c
FIG. 2
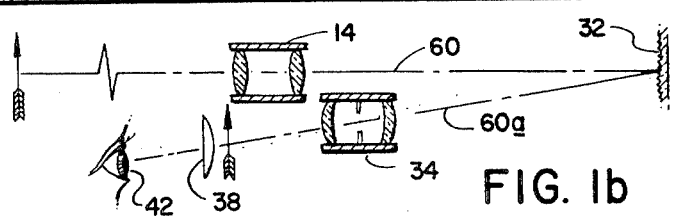
FIG. 1b
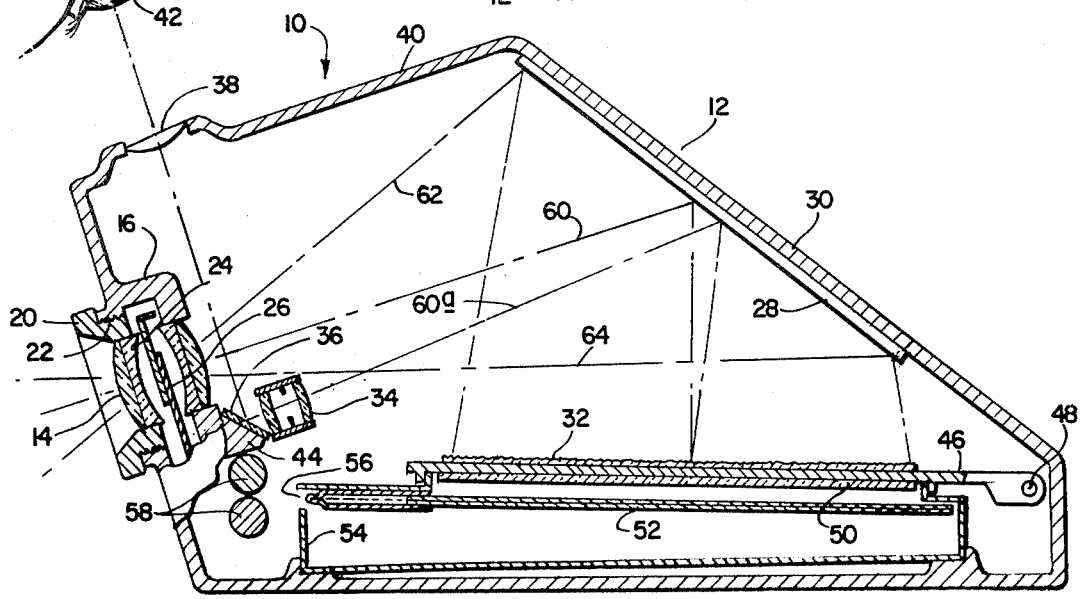
FIG. 1a

REFLEX CAMERA AND VIEWER WITH A FOLDED OPTICAL PATH

BACKGROUND OF THE INVENTION

The present invention concerns a viewer for a reflex camera of the kind having an objective lens and a mirror that reflects an image onto a photosensitive film unit. Cameras of this kind are relatively compact, but the folded optical path therein introduces some difficulty in providing a satisfactory viewer. The viewer must permit an observer to see an image formed on a focusing screen temporarily interposed in the optical path over the photosensitive film unit so he can focus the reflex camera and frame the image.

The viewer arrangements, common to reflex cameras without folded optical paths, employing pivoted mirrors or beam splitters are not suitable for the present reflex camera, particularly because of space considerations, but also for certain photographic considerations.

SUMMARY OF THE INVENTION

The present invention concerns a viewer suitable for a reflex camera with a folded optical path. It incorporates a small image-forming lens and a folding mirror plus an eye lens. The reflex camera has an objective lens with a shutter that refracts light into a real image. A viewing mirror reflects the image onto a focusing screen that covers a photosensitive film unit while both the camera is being focused and the image is being framed. The focusing screen rotates upward and a reflex mirror moves into a position where it then reflects the image directly onto the photosensitive film surface.

When the camera is set for using the viewer, the focusing screen reflects the light forming the image thereon back into the viewing mirror and towards the objective lens. A small image-forming lens situate proximate the objective lens, but outside the photographic light path, receives light from the focusing screen and forms an image of both the focusing screen and the scene refracted onto it by the objective lens. A small folding mirror behind the image-forming lens reflects the image transverse the optic axis of the objective lens toward an eye lens situated at a window in the upper portion of a housing enclosing the reflex camera. The eye lens magnifies the image of the focusing screen in the viewer to a comfortable size for an observer peering downward. An important advantage achieved by the foregoing arrangement is minimizing key-stone distortion of the focusing screen image otherwise caused by a large angle between the viewer axis and the camera axis.

In an alternative embodiment, a penta-prism and field lens allow another change in direction of the optical path in the viewer so the observer can see the image of the focusing screen by looking in a forward direction.

Accordingly, an object of the present invention is a compact viewer substantially free of key-stone distortion.

Another object of the present invention is a viewer comprising conventional optical elements.

A further object of the present invention is a folded reflex camera and a viewer having an optical axis close to the optical axis of the camera.

Other objects of the invention will in part be obvious and will in part appear hereinafter.

The invention accordingly comprises the apparatus possessing the construction, combination of elements, and arrangement of parts that are exemplified in the following detailed disclosure, the scope of its application will be indicated in the claims.

For a fuller understanding of the nature and objects of the invention, reference should be had to the following detailed description taken in connection with the accompanying drawing wherein:

FIG. 1a illustrates a folded reflex camera with a viewer according to the present invention;

FIG. 1b is a schematic illustration of the optical system in the reflex camera;

FIG. 1c illustrates a trapezoidal field that the invention prevents; and

FIG. 2 illustrates an alternate embodiment of the invention.

THE PREFERRED EMBODIMENT

A folded reflex camera 10, according to the present invention, is shown in FIG. 1a. It includes a housing 12 with an objective lens 14 fitted into a cell 16 on the forward wall 18 of the housing 12. The cell 16 includes a focusing bezel 20 attached to the cell 16 by a screw thread 22. At least one element of the objective lens 14 moves axially with the focusing bezel 20 as it rotates on the screw thread 22. An aperture stop 24 and a shutter 26 occupy a central air space within the objective lens 14. They regulate photographic exposures made with the reflex camera 10 in a well-known way. Controls (not shown) determine the aperture size and the shutter speed as selected by the photographer.

The objective lens 14 refracts light from a subject forming a real image of the subject inside the housing 12. A folding mirror 28, attached to a rearward wall 30, reflects the real image toward a focusing screen 32. The focusing screen 32 comprises a plurality of concentric grooves with a reflective aluminum film on their surface. The reflective grooves form a Fresnel mirror having an optic axis slightly skewed to the optic axis of the objective lens 14. The Fresnel mirror of the focusing screen 32 reflects light reaching it from the objective lens 14 toward the folding mirror 28 from where it is reflected again, back toward the objective lens 14. The Fresnel mirror of the focusing screen 32 has a focal length chosen so it will form an image of the aperture stop 24 (i.e., an exit pupil) in the vicinity of the objective lens 14. The slight skewing of the Fresnel mirror's axis causes the exit pupil to fall on a compound lens 34 situate outside the solid angle of the camera's field. A panoramic lens is a useful type for the present purpose.

The compound lens 34 forms a real image of the focusing screen 32 and any scene formed thereon by the objective lens 14. A small mirror 36 reflects the real image upward toward an eye lens 38 fitted into an upper wall 40 of the housing 12. The eye lens 38 magnifies the real image formed by the compound lens 34 to a comfortable size for the observer 42. Both the compound lens 34 and the small mirror 36 immediately behind it are supported by a post 44 projecting inwardly from the forward wall 18.

During focusing and framing preparatory to photographing a scene, the open shutter 26 admits light into the camera forming an image on the focusing screen 32. As explained above, the viewing arrangement (including folding mirror 28, compound lens 34, small mirror 36, and eye lens 38) permits the observer to see and evaluate the sharpness of the image on the focusing screen 32 as he focuses the objective lens on a subject by turning the focusing bezel 20.

To take a photograph, the observer operates a shutter release (not shown) that first closes the shutter 26 and then rotates a carrier plate 46 upwardly about an axle 48. The carrier plate 46 bears the focusing screen 32 on its upper surface and a reflex mirror 50 on its lower surface. At the end of its upward rotation, the carrier plate 46 stops with the reflex mirror 50 parallel to the folding mirror 28. The upward rotation of the carrier plate 50 uncovers a photographic film unit 52 of the self-processing kind. The mechanical arrangements of the camera 10 maintain precisely the same optical path distance, between the film unit 52 and the objective lens 14 via the reflex mirror 52, as between the focusing screen 32 and the objective lens 14 via the folding mirror 28. Therefore, any scene focused by the objective lens 14 on one is focused on the other, too.

When the reflex mirror 52 arrives in its position parallel to the folding mirror 28, the shutter 21 opens for an instant to expose the film unit 52. After the exposure, the carrier plate 46 rotates downwardly and the shutter 26 opens after the focusing screen 32 reaches its lowermost position and covers the film unit 52.

The film unit 52, one of a plurality (not shown) stored in a cassette 54, passes out through a slot 56 in the cassette 54 and between a pair of processing rolls 58 that actuate the development of the latent image recorded on the film unit 52. The carrier plate 46 covers the upper opening in the cassette 54 to prevent fogging the next film unit (not shown) during focusing.

An automatic mechanism can perform the sequence described above. Neither the sequence nor the mechanism constitutes part of the present invention except for the use of certain existing elements in the viewing arrangement.

A principal light ray 60 illustrates the general path of light through the camera 10. The light ray 60, co-linear with the optic axis of the objective lens 14, enters the camera 10 and reflects from the folding mirror 28 toward the focusing screen 32. Due to the slight skewing of the focusing screen 28's optic axis with respect to the objective lens 14's optic axis, the reflected light ray 60a leaves the focusing screen 32 at an acute angle to the incident light ray 60. Chief rays 62 and 64 define the solid angle subtended by the camera 10's field of view. The compound lens 34 is just below the ray 64 so it will not block the field of view. Light ray 60a reflects from folding mirror 28 toward the compound lens 34 and proceeds on to the observer 42 as shown.

The non-normal angle of reflection from the focusing screen 32 of the principal light ray 60a introduces a certain amount of distortion in the image seen through the viewer comprising the compound lens 34 and the eye lens 38. The distortion results, at least in part, from a slight differential magnification between the forwardmost part of the image and the rearwardmost part of the image on the focusing screen 32. While the distortion is slight, its elimination is desirable for aesthetic reasons. To accomplish this, the optic axes of the viewer's elements, the eye lens 36 and the compound lens 34, are skewed to the path of the principal ray 60a through the viewer.

Reference should be had to FIG. 1b. FIG. 1b illustrates the schematic relation of the principal optical elements comprising the camera 10 and the viewer.

The important feature to notice is the parallelism between the principal ray 60, co-linear with the optic axis of the objective lens 14, and the optic axes of the eye lens 38 and the compound lens 34. Clearly, this relation skews those optic axes with regard to the direction of the reflected principal ray 60a. That direction represents the axis of the viewer.

Failure to skew the optic axes of the compound lens 34 and the eye lens 38 leaves a residual amount of field tilt in the image seen through the viewer. The trapezoidal appearance of a tilted field is illustrated in FIG. 1c. The top of the field appears further away, and the smaller angle subtended by light rays from that region of the field makes the top appear smaller imparting the trapezoidal shape to the field. Minimizing the angle between the reflex camera's axis 60 and the viewer's axis 60a reduces the field tilt. Field tilt is mathematically described by a term that includes a cosine factor; therefore, it increases only slowly at first as the off angle increases. However, the human eye, for some reason, is quite sensitive to distortion and will perceive a departure from rectilinearity of as little as four percent. This residual distortion is corrected by refracting the light rays from the top of the field more strongly than those from the bottom of the field. To accomplish this, one tilts the eye lens 38 and the compound lens 34 as shown, causing stronger refraction of the light rays from the upper portion of the field because they intersect the refracting surfaces further from the optic axes than those light rays from the lower portion of the field.

Ordinarily this solution might require very strong refractive powers in the eye lens 38, thereby introducing lateral chromatic aberration into the viewer's image unless an expensive achromatic eye lens were used. However, minimizing the angle between the axes 60 and 60a reduces the refractive strength required in the eye lens 38 for overcoming field tilt. Thus, according to the present invention, a single lens element can be used without introducing unacceptable lateral chromatic aberrations into the viewer because of the minimal angle between the axes 60 and 60a.

The compound lens 34 forms a real image of the focusing screen 32 at a point intermediate itself and the eye lens 38. The several elements constituting the compound lens 34 permit control over the aberrations otherwise present in the image magnified by the eye lens 38.

FIG. 2 illustrates an alternate embodiment of the camera 10 having a viewer arranged so the observer 42 looks in the direction he aims the camera 10 as he watches an image through the viewer. To accomplish this, the optics of the viewer are rearranged.

A folding mirror 70, on a bracket 72, receives light from the Fresnel mirror focusing screen 32 via the viewing mirror 28 and reflects it to a compound panoramictype lens 76. A penta-prism 78, or some similar arrangement of reflecting surfaces, turns the optical path of the viewer 90° so it reaches the observer 80 following a path parallel to the axis of the objective lens 14. A field lens 82 promotes brightness in the viewed field in the usual way, and an eye lens 84 magnifies the image formed by the compound lens 76 to a size suitable for the observer 80. A cover 86 encloses the viewer and excludes stray light that might otherwise interfere with seeing a clear image through the viewer.

Since certain changes may be made in the apparatus described above without departing from the scope of the invention involved herein, it is intended that all matter contained in the above description or shown in the accompanying drawings shall be interpreted as illustrative and not in a limiting sense.

What is claimed is:

1. In a camera of the type having a housing; an objective lens in a forward wall of said housing; means for positioning a film unit at a focal plane of said objective lens; a reflective focusing screen normally adjacent said focal plane; and a viewing mirror inside said housing and rearward of said objective lens, and oriented to reflect a primary image formed by said objective lens onto said focusing screen and from said focusing screen to an area proximate said objective lens, the improvement comprising:
   compound lens means located at said area proximate said objective lens and opposite said viewing mirror, for receiving light reflected to it from said focusing screen by said viewing mirror, and for forming a real image of said focusing screen and said primary image thereon;
   a window in an upper wall of said housing;
   a small mirror, adjacent said compound lens means, positioned to reflect light emanating from said real image-forming means toward said window; and
   an eye lens, in a location where it receives light from said small mirror, for magnifying said real image.

2. The improved camera described in claim 1, wherein said compound lens means is a panoramic type lens located outside the angular field of said objective lens so it will not obstruct the field of view, said panoramic lens and said objective lens both characterized by an optic axis, said panoramic lens oriented so its optic axis is parallel to the optic axis of said objective lens.

3. The improved camera described in claim 2, wherein said eye lens is at said window and it is characterized by an optic axis oriented at an acute angle to the path of light through said window, said acute angle being equal to the angle between said panoramic lens and said path.

4. In a reflex camera of the type having a housing; an objective lens in a forward wall of said housing; a reflective focusing screen at a focal plane of said objective lens; and a viewing mirror inside said housing and rearward of said objective lens for and oriented to reflect a primary real image formed by said objective lens onto said focusing screen and from said focussing screen to an area proximate said objective lens, the improvement comprising:
   a window in an upper wall of said housing;
   a small mirror, proximate said objective lens, but substantially outside the angular field of said objective lens so it will not obscure any portion of said primary image, for reflecting light reaching said small mirror from said reflective focusing screen, via said viewing mirror, toward said window;
   a compound lens, situate in the path of said light emanating from said reflective focusing screen but substantially outside the angular field of said objective lens, to form a secondary real image of said reflective focusing screen and said primary real image formed thereon; and
   an eye lens, situate in said path, for magnifying said secondary real image.

5. The improved reflex camera described in claim 4, wherein said small mirror is oriented to reflect said light transversely to the optic axis of said objective lens.

6. The improved reflex camera described in claim 5, wherein said small mirror is positioned close to said optic axis without obscuring the angular field of said objective lens so as to minimize the angle between said optic axis and the path of light reaching said small mirror from said focusing screen.

7. The improved reflex camera described in claim 6, wherein said eye lens and said compound lens are oriented so their optic axes are at acute angles to the path of light through them between said focusing screen and said window, said acute angle being substantially equal to the angle, at said focusing screen, between said path and the optic axis of said objective lens.

8. The improved reflex camera described in claim 7, wherein said compound lens is of the panoramic type.

9. The improved reflex camera described in claim 8, wherein said panoramic lens is below said angular field, proximate said small mirror.

10. The improved reflex camera described in claim 9, wherein said eye lens is situate in said window.

11. The improved reflex camera described in claim 8, wherein said panoramic lens is above said small mirror, between said folding mirror and said window.

12. The improved reflex camera described in claim 11, further comprising: reflecting means, outside said window, for turning said light in a direction substantially parallel to the optical path of said objective lens; and a field lens, behind said reflecting means, for promoting the brightness of an image seen through said window, said eye lens being situate behind said field lens toward the rear of said reflex camera housing.

13. In a reflex camera of the type having a housing; an objective lens in a forward wall of said housing; means for locating a photosensitive film unit at a predetermined position in a lower portion of said housing; a reflective focusing screen, movably mounted within said housing so as to protect said film unit from exposure while said objective lens is focused by forming a primary image of a subject on said focusing screen; and a reflex mirror in said housing, oriented to reflect said primary image from said objective lens downward onto said focusing screen and from said focusing screen to an area proximate said objective lens, the improvement comprising:
   window means, in an upper wall of said housing, for permitting an observer to view into said reflex camera;
   lens means, situate inside said housing, at said area proximate said objective lens and below the path of light refracted by said objective lens, for receiving light from said focusing screen via reflection from said reflex mirror, and for forming a secondary image of said focusing screen and said primary image thereon;
   means, situate between said lens means and said forward wall, for reflecting said secondary image toward said window means;
   eye lens means, proximate said window means, for magnifying said secondary image.

14. The improved reflex camera described in claim 13, further comprising: an optic axis for each of said objective lens, said lens means and said eye lens means, wherein said optic axis of said lens means is parallel to said optic axis of said objective lens and it is at an acute angle with respect to the path of light entering said lens means, and wherein said optic axis of said eye lens means is at said acute angle with respect to said path of light where it enters said eye lens means.

15. In a reflex camera of the type having a housing; an objective lens in a forward wall of said housing; means for locating a photosensitive film unit at a predetermined position in a lower portion of said housing; a reflective focusing screen, movably mounted within said housing so as to protect said film unit from exposure while said objective lens is focused by forming a primary image of a subject on said focusing screen; and a reflex mirror in said housing, oriented to reflect said primary image from said objective lens downward onto said focusing screen and from said focusing screen to an area proximate said objective lens, the improvement comprising:

window means in an upper wall of said housing;

first reflecting means, situate inside said housing at an area proximate said objective lens and below the path of light refracted by said objective lens, for directing light emanating from said primary image and reaching said first reflecting means via reflection from said reflex mirror toward said window means;

lens means, inside said housing, between said window means and said first reflecting means, for receiving light from said focusing screen via successive reflections from said reflex mirror and said first reflecting means and for forming a secondary image of said focusing screen and said primary image formed thereon;

second reflecting means, situate outside said houisng at said window means, for turning the light forming said secondary image toward the rear of said housing in a direction generally parallel to the optic axis of said objective lens;

eye lens means, rearward of said second reflecting means, for magnifying said secondary image.

16. The improved reflex camera described in claim 15, further comprising a field lens, situate between said second reflecting means and said eye lens.

17. The improved reflex camera described in claim 16, wherein said second reflecting means consists of a penta-prism and further comprising a cover over said penta-prism, said field lens and said eye lens to exclude light therefrom except for that light emerging from said window means.

18. A reflex camera comprising:
an objective lens;
an eye lens;
means, defining an optical path between said objective lens and said eye lens at least one portion of said optical path lying within the angular field of said objective lens and other portions of said optical path lying outside the angular field of said objective lens, said optical path defining means including a reflective focusing screen positioned at a focal plane of said objective lens, a first mirror disposed to first reflect a primary real image formed by said objective lens onto said reflective focusing screen and to subsequently reflect said primary real image as it emanates from said reflective focusing screen along said optical path towards a position proximate said objective lens along said other portions of said optical path, and a second mirror disposed at said position proximate said objective lens and lens means disposed at a position along said other portions of said optical path and operative to form a secondary real image of said reflective focusing screen and said primary real image formed on said reflective focusing screen, said secondary real image so formed being adapted for viewing through said eye lens.

19. A reflex camera comprising:
a first wall;
means for positioning at least one film unit within said camera so as to extend along a portion of said first wall;
a forward wall;
an objective lens mounted in said forward wall;
a reflective focusing screen positioned to overlie such film unit, when such film unit is disposed within said positioning means, at a focal plane of said objective lens;
a rear wall;
a first mirror attached to said rear wall so as to be canted over said reflective focusing screen;
another wall extending between said forward and rear walls on the opposite side of said objective lens from said first wall, said other wall having discrete light transmissive means positioned at a selective location thereon;
a second mirror situate adjacent said objective lens and lying substantially outside the angular field of said objective lens; and
an eye lens operatively associated with said light transmissive means,
said first mirror, said reflective focusing screen, and said second mirror being further arranged within said camera to define an optical path within said camera so that light rays entering said camera through said objective lens are sequentially reflected by said first mirror onto said reflective focusing screen, reflected by said reflective focusing screen back onto said first mirror, reflected by said first mirror onto said second mirror and reflected by said second mirror through said light transmissive means of said other wall.

20. The reflex camera of claim 19, additionally including means, lying substantially outside the angular field of said objective lens, for forming an intermediate real image of said reflective focusing screen and any image formed thereon by said objective lens that said eye lens will magnify positioned along said optical path.

21. The reflex camera of claim 19, wherein said second mirror is positioned on the opposite side of said objective lens from said other wall.

* * * * *